United States Patent [19]

Syo et al.

[11] Patent Number: 5,453,971
[45] Date of Patent: Sep. 26, 1995

[54] RECORDED AREA DETECTION TO PREVENT INFORMATION OVERWRITING

[75] Inventors: Hirokazu Syo; Takaharu Yoshida, both of Kanagawa, Japan

[73] Assignee: Kabushiki Kaisha Toshiba, Kanagawa, Japan

[21] Appl. No.: 107,606

[22] Filed: Aug. 18, 1993

[30] Foreign Application Priority Data

Aug. 24, 1992 [JP] Japan .................................. 4-223929

[51] Int. Cl.$^6$ .................................................. G11B 7/00
[52] U.S. Cl. ........................... 369/126; 369/54; 369/58; 369/48; 369/124; 369/116
[58] Field of Search ................................ 369/54, 58, 48, 369/32, 116, 124, 275.2, 275.3, 126

[56] References Cited

U.S. PATENT DOCUMENTS

| | | | |
|---|---|---|---|
| 4,956,832 | 9/1990 | Miyasaka | 369/116 |
| 5,060,218 | 10/1991 | Chiyomatsu | 369/54 |
| 5,101,396 | 3/1992 | Takeuchi et al. | 369/116 |
| 5,132,954 | 7/1992 | Kulakowski et al. | 369/275.3 |
| 5,229,985 | 7/1993 | Oshiba | 369/124 |
| 5,283,779 | 2/1994 | Otsuki | 369/275.2 |
| 5,305,298 | 4/1994 | Yokota | 369/116 |

*Primary Examiner*—Georgia Y. Epps
*Assistant Examiner*—Kim-Kwok Chu
*Attorney, Agent, or Firm*—Finnegan, Henderson, Farabow, Garrett & Dunner

[57] ABSTRACT

An apparatus for detecting an information recorded area on an information recording medium having the information recorded area and an information non-recorded area. The apparatus includes an optical head for radiating a light beam onto the information recording medium, a motor for rotating the information recording medium. In the apparatus, an electrical signal corresponding to a reflected light reflected by the information recording medium while the information recording medium is rotated is generated. The electrical signal corresponds to the information recorded in the information recorded area, and the electrical signal changes between a first potential level and a second potential level which is different from the first potential level. Further, in the apparatus, a threshold signal is generated by dropping the first potential level with a prescribed potential and raising the second potential level with the prescribed potential, and delaying the electrical signal. The electrical signal is compared with the threshold signal and a resulting signal is generated. The information recorded area on the information recording medium is detected based on the resulting signal.

12 Claims, 6 Drawing Sheets

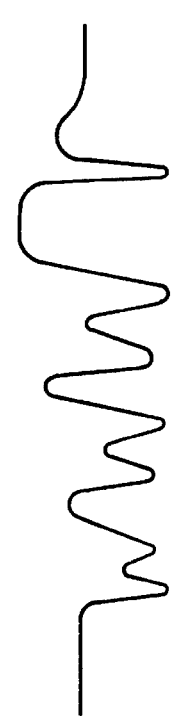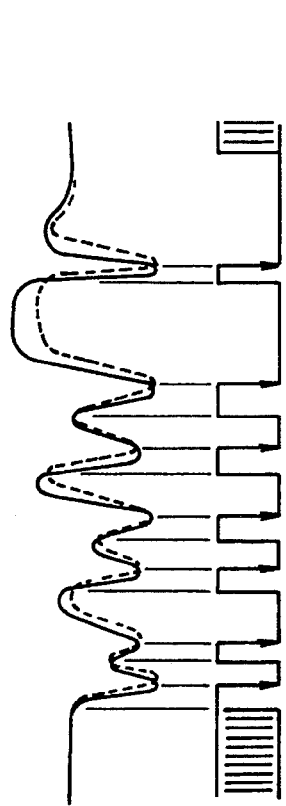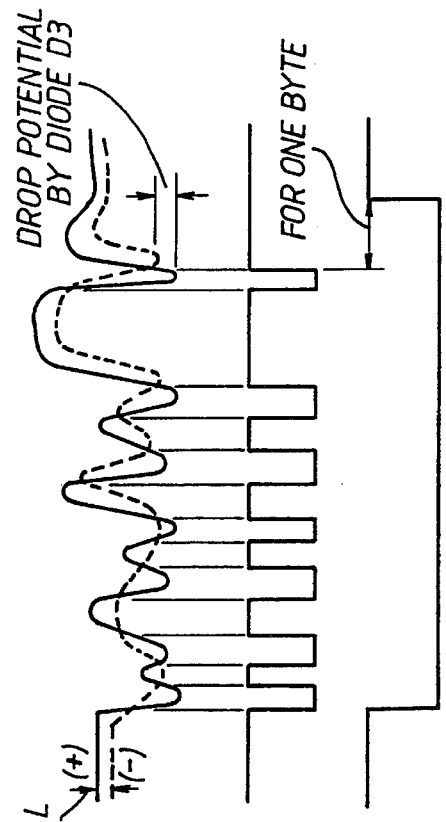

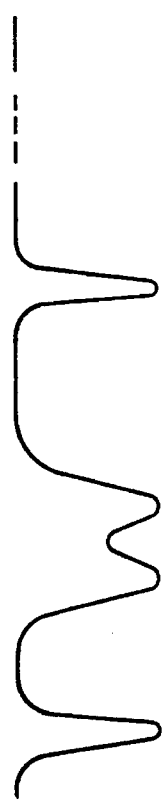
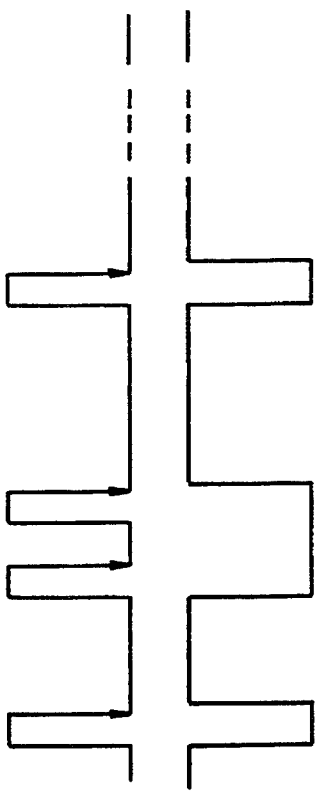
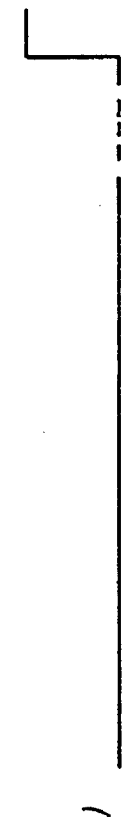
Fig. 4A ELECTRIC SIGNAL
Fig. 4B OUTPUT SIGNAL FROM COMPARATOR 46 (BINARIZED SIGNAL)
Fig. 4C OUTPUT SIGNAL FROM COMPARATOR 48 (PULSE SIGNAL)
Fig. 4D DATA CLOCK SIGNAL
Fig. 4E RECORDED AREA DETECTION SIGNAL (OUTPUT FROM COUNTER)
Fig. 4F OUTPUT SIGNAL FROM INVERTER 49b 5,453,971

1

RECORDED AREA DETECTION TO PREVENT INFORMATION OVERWRITING

BACKGROUND OF THE INVENTION

1. Field of the Invention

The present invention relates to an information processing apparatus which executes the recording and reproducing of information for recording media such as optical disks, etc.

2. Related Art of the Invention

Various kinds of information processing apparatus using optical disks as recording media, that is, so-called optical disk drives have been developed in recent years. On these optical disk drives, information are recorded on an optical disk by applying a laser beam which are generated from a semiconductor laser oscillator, that is, a light source in an optical head to an optical disk. Further, the reflected light of the laser beam from the optical disk is received by a detector provided in the optical head and information recorded on the optical disk is read by converting this laser beam into electric signals.

On the optical disk drive, when recording information, new information may be written inadvertently on adjacent tracks where other information have been already written due to tracking error etc. caused by external shocks. In other words, there was a possibility for destructing already written information by overwriting new information on them.

In the optical disk drive, it was necessary to determine whether there were already recorded information or not when the information were read out from the optical disk.

As disclosed in U.S. Pat. No. 5,101,396 (issued on Mar. 31, 1992), it was a practice so far made to determine whether there were already recorded information by using the upper end detection signal of information signal read out of the optical disk.

However, as circuits for making the determination, two circuits: an upper detection circuit and a binarization circuit were needed. As a result, the entire circuits of the optical disk drive were so complicated.

SUMMARY OF THE INVENTION

It is an object of the present invention to provide an information processing apparatus which is simple in circuit construction and is capable of determining whether a recording area is a recorded area or a non-recorded area accurately at a high speed.

According to the present invention there is provided an apparatus for detecting an information recorded area on an information recording medium having the information recorded area and an information non-recorded area, the apparatus comprising means for radiating a light beam onto the information recording medium; means for relatively moving the radiating means and the information recording medium; first generating means for generating an electrical signal corresponding to a reflected light reflected by the information recording medium while the radiating means and the information recording medium relatively moves, the electrical signal corresponding to the information recorded in the information recorded area, the electrical signal changing between a first potential level and a second potential level which is different from the first potential level; second generating means for generating a threshold signal by dropping the first potential level with a prescribed potential and raising the second potential level with the prescribed potential, and delaying the electrical signal; means for comparing

2 the electrical signal with the threshold signal and outputting a resulting signal; and means for detecting the information recorded area based on the resulting signal.

BRIEF DESCRIPTION OF THE DRAWINGS

FIG. 2 is a circuit diagram showing the construction of a video signal processor of the optical disk drive shown in FIGS. 1-1 and 1-2;

FIGS. 3A to 3G are waveform charts showing signals at various parts for explaining the operation of the video signal processor shown in FIG. 2;

FIGS. 4A to 4F are waveform charts showing signals at various parts for explaining the operation of the video signal processor shown in FIG. 2.

DETAILED DESCRIPTION OF THE PREFERRED EMBODIMENT

Hereinafter, an embodiment of the present invention will be described in detail with reference to the drawings.

Figure 1:
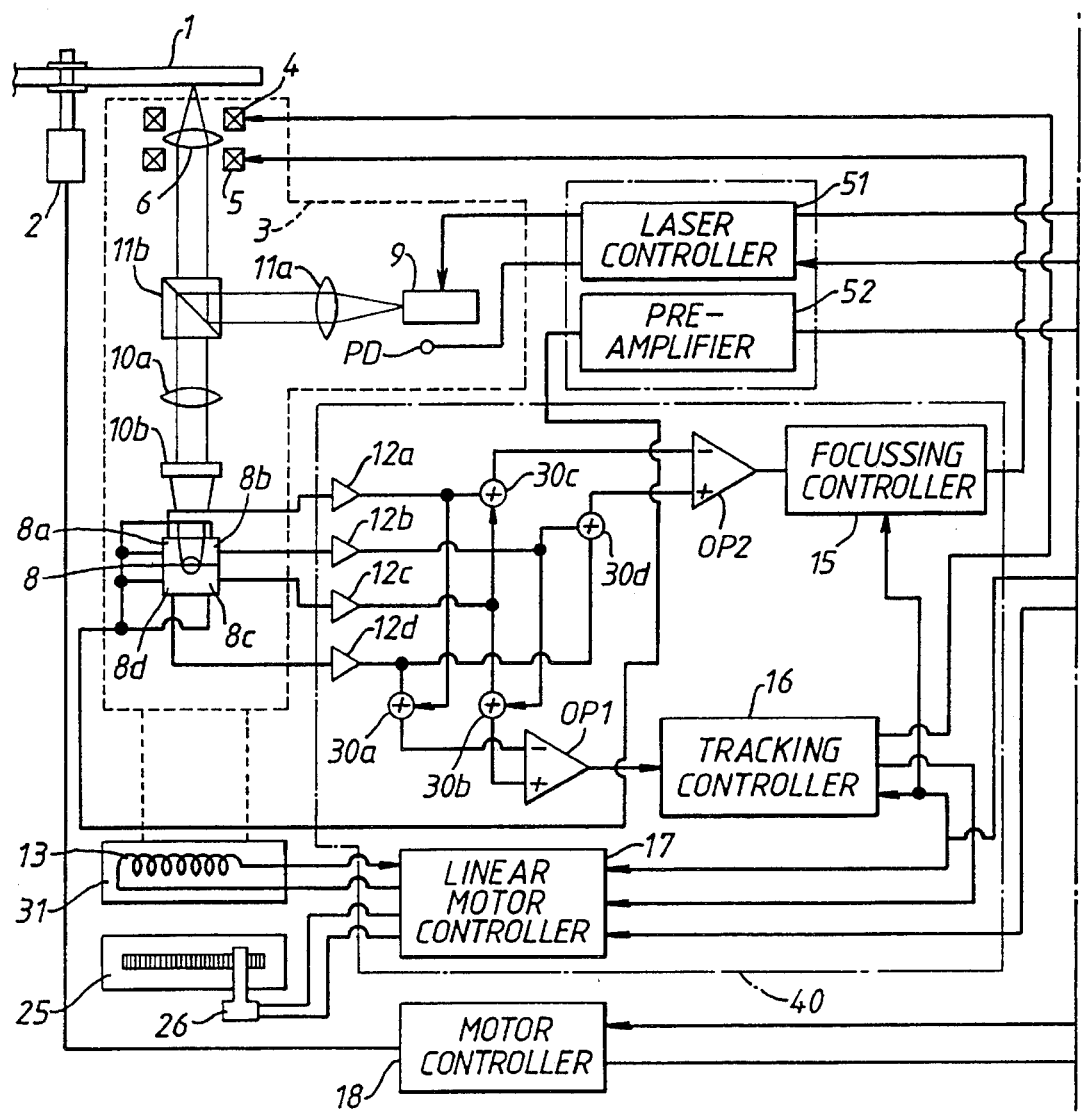
FIGS. 1-1 and 1-2 are a block diagram showing the outline of the construction of an optical disk drive involved in one embodiment of the present invention.
Figures 1, 2:
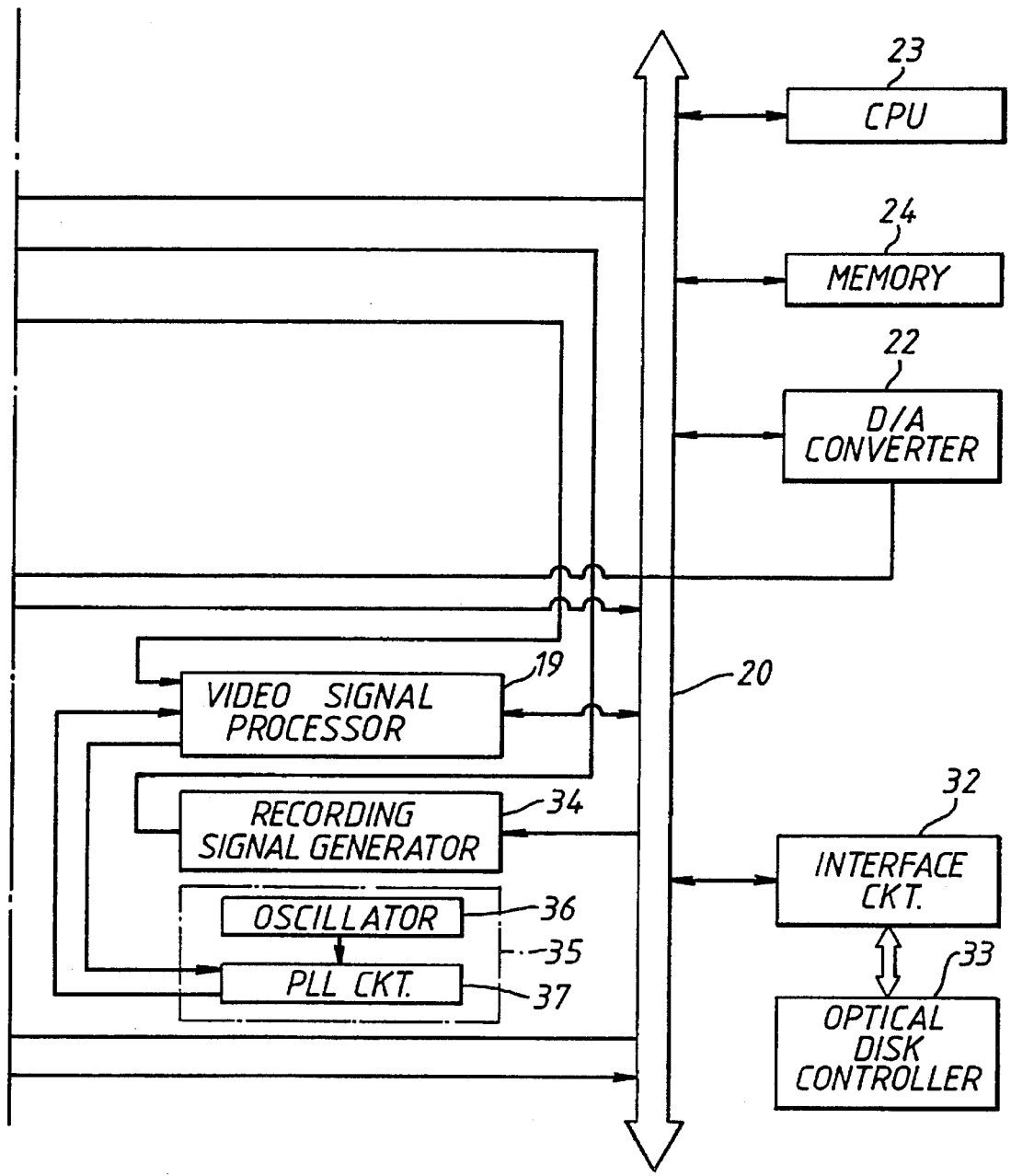
Figure 2:
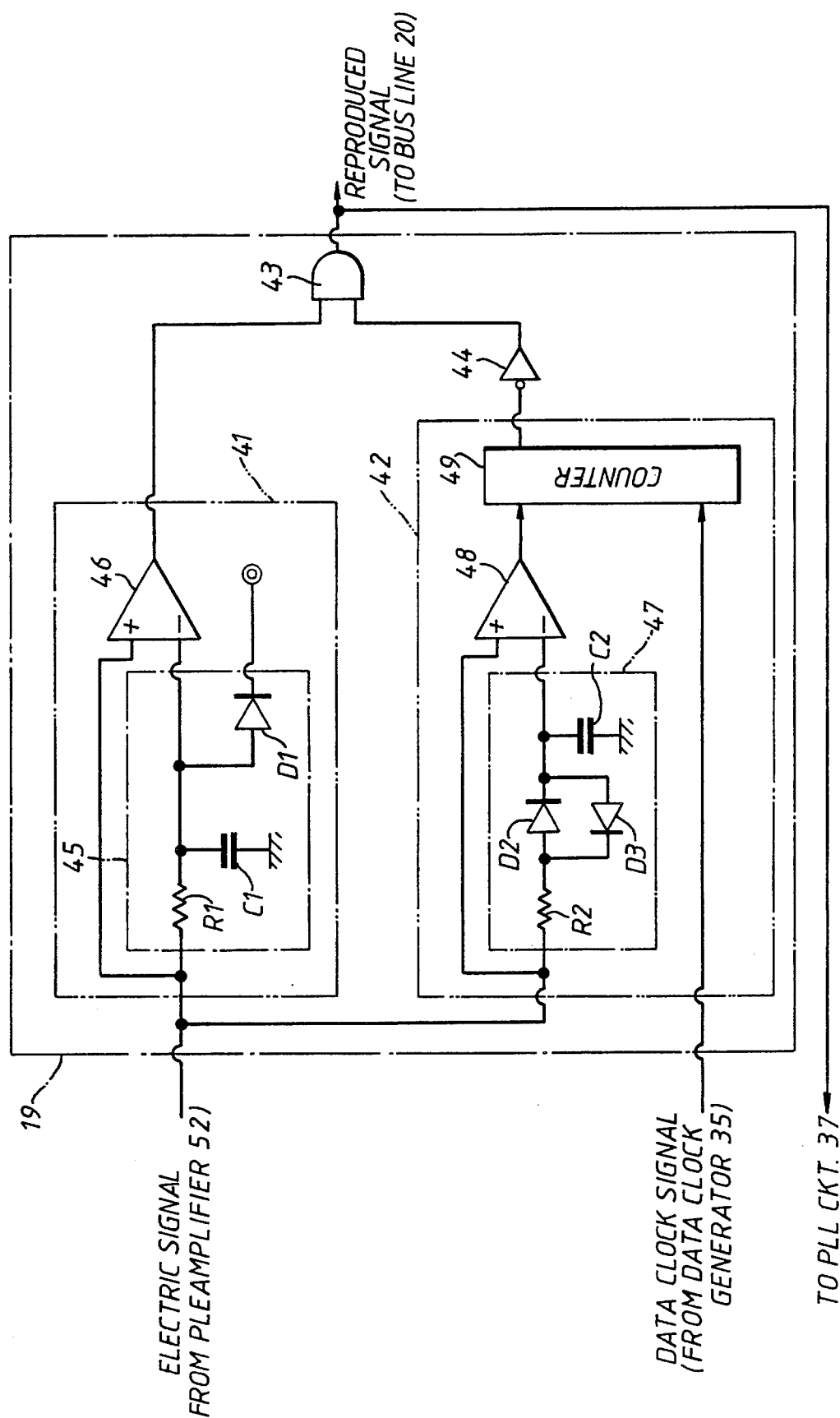

FIGS. 1-1 and 1-2 are a block diagram showing the outline of the construction of an optical disk drive of this embodiment. This optical disk drive records, reproduces or erases information on an optical disk 1, which is an information recording medium, using a focusing beam.

On the surface of the optical disk 1, recording tracks in spiral or concentric circle shape have been formed, and this optical disk 1 is rotated by a motor 2 at, for instance, a constant speed. This motor 2 is controlled by a motor control circuit 18.

The recording/reproducing of information to/from the optical disk 1 is executed by an optical head 3 provided under the optical disk 1. This optical head 3 has been fixed to a driving coil 13 which forms a movable part of a linear motor 31, and this driving coil 13 is connected to a linear motor controller 17.

To the linear motor controller 17, a linear motor position detector 26 has been connected. This linear motor position detector 26 outputs a position signal by detecting an optical scale 25 provided to the optical head 3.

A permanent magnet (not shown) has been provided to the fixed part of the linear motor 31 and when the driving coil 13 is excited by the linear motor controller 17, the optical head 3 is moved in the radial direction of the optical disk 1.

The optical disk 1 is formed with a recording layer on which bits are formed by opening holes, but it is not limited to this type of layer and it may be formed with a recording layer on which the recording is made using phase change between crystal and amorphous. Further, other information recording media such as a magneto-optical disc, etc. may be use. Therefore, the construction of the optical head can be changed according to a kind of information recording medium to be used.

In the optical head 3, an objective lens 6 is kept held by a wire or a plate spring (not shown). This objective lens 6 is moved in the focusing direction, that is, in the direction of the optical axis of the lens by a driving coil 5 and it is movable in the tracking direction, that is, the direction perpendicular to the optical axis of the lens by a driving coil 4.

A laser diode 9 as a semiconductor laser oscillator is driven by a laser controller 51 which is described later and generates laser beams. This laser beams are applied on the optical disk 1 through a collimator lens 11a, a polarized beam splitter 11b and an objective lens 6. The reflected beams from the optical disk 1 are led to an optical detector 8 through the polarized beam splitter 11b, a focusing lens 10a and a cylindrical lens 10b.

There is a photo diode PD provided near the laser diode 9 as a light emitting quantity detector of the laser diode 9 for detecting light emitting quantity. The monitor current from this photo diode PD is supplied to a laser controller 51 as a detecting signal.

The optical detector 8 comprises four divided photo diodes 8a, 8b, 8c and 8d. The cathode sides of these photo diodes 8a, 8b, 8c and 8d are commonly connected to a video signal preamplifier 52 and the anode sides are connected to a focussing/tracking processor 40, respectively.

In the construction as described above, current flows from the cathode toward the anode on the photo diodes 8a, 8b, 8c and 8d corresponding to the reflected beams from the optical disk 1, and the video signal processing is executed using the sum current of these currents taken out of the cathode side and on the other hand, the focusing and tracking control are executed using the sum current taken out of the anode side.

The focussing/tracking processor 40 comprises amplifiers 12a, 12b, 12c and 12d, a focussing controller 15, a tracking controller 16, a linear motor controller 17, adders 30a, 30b, 30c and 30d, and differential amplifiers OP1 and OP2.

The output signal from the photo diode 8a of the optical detector 8 is Supplied to one end of the adders 30a and 30c through the amplifier 12a. The output signal from the photo diode 8b is supplied to one end of the adders 30b and 30d through the amplifier 12b. The output signal from the photo diode 8c is supplied to another end of the adders 30b and 30c through the amplifier 12c. The output signal from the photo diode 8d is supplied to another end of the adders 30a and 30d through the amplifier 12d.

The output from the adder 30a is supplied to the inverse input terminal of the differential amplifier OP1 and the output signal from the adder 30b is supplied to the non-inverse input terminal of this differential amplifier OP1. As a result, the differential amplifier OP1 supplies a track difference signal to the tracking controller 16 according to a difference between the output signals from the adders 30a and 30b. The tracking controller 16 generates a track driving signal according to the track difference signal supplied from the differential amplifier OP1.

The track driving signal that is output from the tracking controller 16 is supplied to the driving coil 4 in the tracking direction. The track difference signal used in the tracking controller 16 is also supplied to the linear motor controller 17.

The output signal of the adder 30c is supplied to the inverse input terminal of the differential amplifier OP2 and the output signal of the adder 30d is supplied to the non-inverse input terminal of this differential amplifier OP2. As a result, the differential amplifier OP2 supplies a signal concerning a focus to the focusing controller 15 according to a difference between the outputs of the adders 30c and 30d. The output from this focusing controller 15 is supplied to the focusing driving coil 5 to control a laser beam so it is always kept focussed properly on the optical disk 1.

The sum current of the outputs of the photo diodes 8a through 8d of the optical detector 8 in the state where the focusing and tracking are carried out as described above is reflecting uneven bits (recorded information) formed on the tracks. This sum current is converted into voltage values in the video signal preamplifier 52 and supplied to a video signal processor 19. Image data and address data (track number, sector number, etc.) are regenerated in this video signal processor 19. The video signal processor 19 binarizes an electric signal (a voltage value) from the preamplifier 52 and outputs it as a regenerated signal.

The laser controller 51 controls a laser beam generated from the laser diode 9 so that its intensity is selected according to a switching signal from a CPU 23. That is, when reading and reproducing information from the optical disk 1, the laser controller 51 controls the laser diode 9 to generate a weak laser beam having a fixed intensity of light. On the other hand, when recording information on the optical disk 1, the laser controller 51 controls the laser diode 9 to generate an intense laser beam with its intensity modulated according to recording pulses supplied from a recording signal generator 34 corresponding to information to be recorded. The laser controller 51 controls output quantity of light generated from the laser diode 9 according to the monitor current from the photo diode PD.

As described above, the recording signal generator 34 has been connected to the front stage of the laser controller 51. This recording signal generator 34 functions as a modulating circuit for modulating recording data supplied from an optical disk controller 33, which is an external device, through an interface circuit 32 to recording pulses.

The video signal processed in the video signal processor 19 is output to the optical disk controller 33 after the demodulation process, error correction process, etc. in the interface circuit 32.

The data a signal output from the video signal processor 19 is also input to a data clock generator 35. This data clock generator 35 consists of an oscillator 36 and a PLL circuit 37. The PLL circuit 37 generates a data clock signal according to a master clock from the oscillator 36 and the data signal from the video signal processor 19, and this data clock signal is output from the data clock generator 35 and input to the video signal processor 19.

This optical disk drive has been provided with a D/A converter 22 which is used for exchanging information between the focusing controller 15, the tracking controller 16 and the linear motor controller 17 and the CPU 23.

The tracking controller 16 moves a laser beam for one track by moving the objective lens 6 in the direction perpendicular to its optical axis according to a track jump signal supplied from the CPU 23 through the D/A converter 22.

The laser controller 51, the focusing controller 15, the tracking controller 16, the linear motor controller 17, the motor controller 18i the video signal processor 19, the recording signal generator 34, etc. are controlled by the CPU 23 through a bus line 20. This CPU 23 executes the prescribed operations according to a program stored in a memory 24.

The video signal signal processor 19 comprises a data signal binarization circuit 41, a recorded area detecting binarization circuit 42, an AND circuit 43 and an inverter circuit 44 as shown in FIG. 2.

The data signal binarization circuit 41 is a circuit including of a reference voltage generator 45 and a comparator 46 for obtaining a binarized signal by detecting a peak value of electric signal from the preamplifier 52.

The reference voltage generator 45 consists of a differentiation circuit comprising a resistor R1, a capacitor C1 and a diode D1, and generates a delay signal of the electric signal from the preamplifier 52 as a reference voltage signal. That is, this circuit generates a signal of which phase is shifted in the delay direction as shown by the broken line in FIG. 3B.

The comparator 46 binarizes an electric signal from the preamplifier 52 by comparing the electric signal from the preamplifier 52 and a delay signal from the reference voltage generator 45. That is, a binarized signal is generated corresponding to a point where the waveform of the electric signal from the preamplifier 52 shown by a solid line in FIG. 3B crosses the waveform of the delay signal of which phase is shifted in the delay direction as shown by the broken line. In more detail, a binarized signal as shown in FIG. 3C is output. This signal becomes a high level at a point of time when the part near the upper peak of the electric signal shown by the solid line crossed the part of the delay signal shown by the broken line near the lower peak and become a low level at the point of time when the part near the lower peek of the electric signal waveform shown by the solid line crossed the part near the lower peak of the delay signal waveform shown by the broken line.

The recorded area detecting binarization circuit 42, consisting of a threshold signal generator 47, a comparator 48 and a counter 49 as shown in FIG. 2, outputs a recorded area detecting signal according to an electric signal from the preamplifier 52.

The thresholde signal generator 47 is a circuit to generate a thresholde signal, which is a reference signal for binarization, by delaying an electric signal from the preamplifier 52. The electrical signal from the preamplifier 52 has an amplitude comprising high potential levels and low potential levels. The comparator 48 outputs a result of comparison of an electric signal (shown by the solid line in FIG. 3D) from the preamplifier 52 with a thresholde signal (shown by the broken line in FIG. 3D) from the thresholde signal generator 47 as a binarized signal as shown in FIG. 3E. This binarized signal is output as a pulse signal showing the recorded area. The thresholde signal generator 47 is in such structure that a circuit composing of the diodes D2 and D3 connected in parallel each other in reverse polarity is connected between a resistor R2 and a capacitor C2 comprising an integration circuit as shown in FIG. 2.

Each of the diodes D2 and D3 operates to occure a potential drop with a prescribed potential, for instance, approximately 0.6 V in the forward direction, as shown in FIG. 3D. The potential drop of the each of the diodes D2 and D3 correspondes an amplitude which is smaller than that of the electrical signal corresponding to the information recorded in the recorded area and is larger than that of a noise signal corresponding to the non-recorded area.

In the recorded area detecting binarization circuit 42 described above, voltage at the non-inverse input terminal (+) of the comparator 48 is always larger than the voltage at the inverse input terminal (−) for one diode (0.6 V) in an area with no data recorded, that is, the non-recorded area as shown in FIG. 3D and the output of the comparator 48 becomes a high level as shown in FIG. 3E. Further, input signals of the comparator 48 cross each other in the recorded area, generating a pulse signal. That is, when the waveform of an electric signal (shown by the solid line in FIG. 3D) from the preamplifier 52 crossed the waveform of a thresholde signal (shown by the broken line in FIG. 3D) from the thresholde signal generator 47, a pulse signal as shown in FIG. 3E is generated. An area where this pulse signal is being generated corresponds to the recorded area and other areas correspond to the non-recorded areas.

If the pulse signal from the comparator 48 becomes a low level, the counter 49 determines it is the recorded area and outputs a recorded area detection signal ("0" signal) as shown in FIG. 3F. Further, if the pulse signal becomes a high level as shown in FIG. 4C and kept at a high level as long as 16 data clock signals supplied from the data clock generator 35 are counted, the counter 49 determines that it is not the recorded area (the non-recorded area) and outputs a non-recorded area detection signal ("1" signal) as shown in FIG. 4E.

Figure 5:
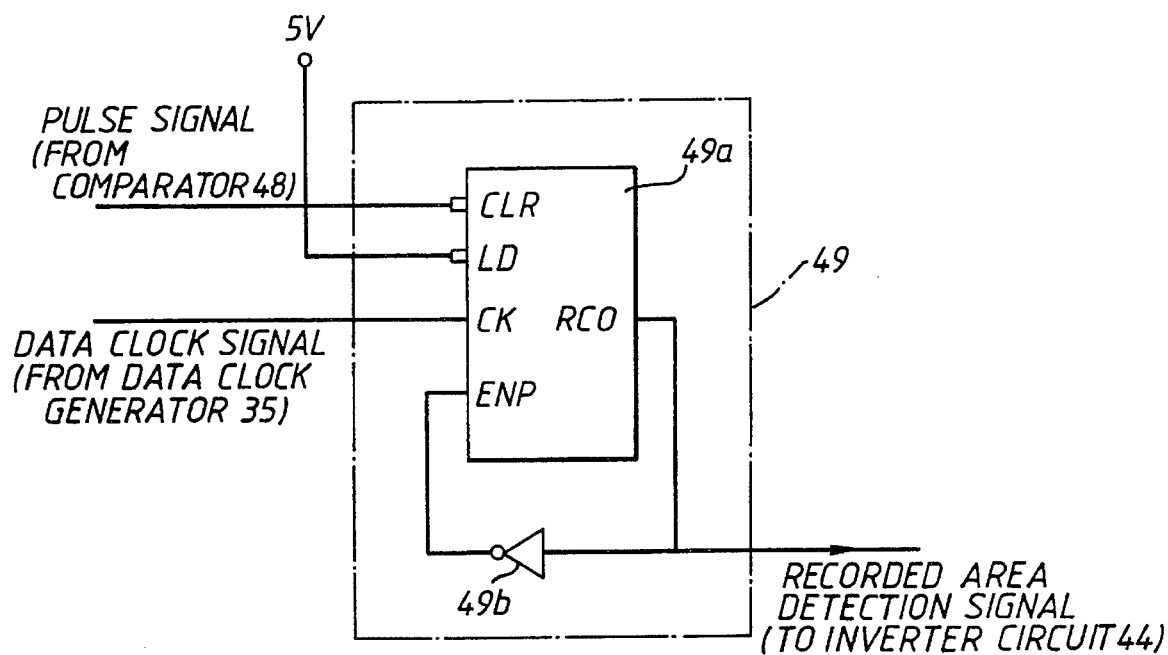
FIG. 5 is a circuit diagram showing the construction of a counter provided in the video signal processor shown in FIG. 2.

The counter 49 consists of a counter IC 49a and an inverter 49b as shown in FIG. 5. If a pulse signal from the comparator 48 becomes a low level, the clear input end (CLR) of the counter IC 49a becomes a low level, and the clear input of the counter IC 49a is reset for the low level enable and the counter output (RCO) becomes a low level as shown in FIG. 4C.

At this time, an electric signal from the preamplifier 52 shown in FIG. 4A has been binarized by a comparator 46 as shown in FIG. 4B.

On the other hand, if a pulse signal from the comparator 48 becomes a high level, the clear input end (CLR) of the counter IC 49a becomes a high level, the clear is canceled and the counter starts the counting.

On the optical disk drive of this embodiment in the construction as described above, if an electric signal as shown in FIG. 3A is supplied to the data signal binarization circuit 41 from the preamplifier 52, the data signal binarization circuit 41 detects a peak value of this electric signal and outputs a binarized signal as shown in FIGS. 3B and 3C.

At the same time, the electric signal from the preamplifier 52 is supplied to the recorded area detecting binarization circuit 42. The recorded area detecting binarization circuit 42 compares a thresholde signal from the thresholde signal generator 47 as shown in FIG. 3D with an electric signal from the preamplifier 52 by the comparator 48 and outputs a pulse signal as shown in FIG. 3E. Then, if this pulse signal becomes a low level, the recorded area detecting binarization circuit 42 outputs a recorded area detection signal ("0" signal) and thereafter, continuously outputs the recorded area detection signal until the high level state of the pulse signal is presented continuously for a prescribed time (a time equivalent to 16 data clock signals).

Thus, as long as the recorded area detection signal is being output from the recorded area detecting binarization circuit 42, a binarized signal which is output from the data signal binarization circuit 41 is output from the AND circuit 43 as shown in FIG. 3G.

As described above, in this embodiment it is possible to determine whether an recording area is a recorded area or a non-recorded area by this information processing apparatus in a simple construction because a thresholde signal is generated by delaying an electric signal from the preamplifier 52 in the thresholde signal generator 47 and a recorded area detecting signal is generated and binarized by comparing this thresholde signal with the electric signal from the amplifier 52.

As described above, the information processing apparatus in simple construction of the present invention is capable of determining a recorded area or a non-recorded area accurately at a high speed, thus promoting reliability of information processing.

As the present invention may be embodied in several forms without departing from the spirit or essential characteristics thereof, the embodiment described above is therefore merely illustrative in all respects and should not be construed to be restrictive. The scope of the present invention is defined by the appended claims and not restricted by the description of the specification and further, all alternations or changes within the scope or equivalence are embraced by the claims.

What is claimed is:

1. An optical information recording system for detecting an information recorded area on an information recording medium, the system comprising:

means for radiating a light beam onto the information recording medium to record information on the information recording medium;

means for moving the radiating means to a recording area on which the information will be recorded;

first generating means for generating an electrical signal only corresponding to the information recorded in the information recorded area, the electrical signal having a first potential level and a second potential level differing from the first potential level;

second generating means for generating a threshold signal by dropping the first potential level with a prescribed potential and raising the second potential level with the prescribed potential, and delaying the electrical signal;

means for comparing the electrical signal with the threshold signal and outputting a resulting signal; and means for detecting that the recording area to which the radiating means is moved by the moving means, is the recording area on which the information will be recorded based on the resulting signal to prevent overwriting information.

2. The system according to claim 1, wherein the second generating means includes an integration circuit comprising a resistor and a capacitor, and first and second diodes connected in parallel in reverse directions relative to each other between the resistor and the capacitor.

3. The system according to claim 2, wherein each of the first and second diodes causes a potential drop with the prescribed potential in a forward direction.

4. The system according to claim 2, wherein the potential drop of the first and second diodes corresponds to an amplitude which is smaller than that of an electrical signal corresponding to the information recorded in the information recorded area and is larger than that of a noise signal corresponding to an information non-recorded area on the information recording medium.

5. The system according to claim 3, wherein the prescribed potential is approximately 0.6 V.

6. An optical information recording system for detecting an information recorded area on an information recording medium, the system comprising:

means for radiating a light beam onto the information recording medium;

means for relatively moving the radiating means and the information recording medium;

first generating means for generating an electrical signal only corresponding to the information recorded in the information recorded area, the electrical signal having a first potential level and a second potential level differing from the first potential level;

second generating means for generating a threshold signal by dropping the first potential level with a prescribed potential and raising the second potential level with the prescribed potential, and delaying the electrical signal;

means for comparing the electrical signal with the threshold signal and outputting a resulting signal;

means for detecting that the recording area to which the radiating means is moved by the moving means, is the recording area on which the information will be recorded based on the resulting signal to prevent overwriting information; and means for reproducing the information recorded on the information recording medium by using the resulting signal.

7. The system according to claim 6, wherein the second generating means includes an integration circuit comprising a resistor and a capacitor, and first and second diodes connected in parallel in reverse directions relative to each other between the resistor and the capacitor.

8. The system according to claim 7, wherein the each of the first and second diodes causes a potential drop with the prescribed potential in a forward direction.

9. The system according to claim 7, wherein the potential drop of the first and second diodes corresponds to an amplitude which is smaller than that of an electrical signal corresponding to the information recorded in the information recorded area and is larger than that of a noise signal corresponding to an information non-recorded area on the information recording medium.

10. The system according to claim 8, wherein the prescribed potential is approximately 0.6 V.

11. The system according to claim 6, wherein the detecting means includes:

means for counting a time corresponding to one byte after no resulting signal is output from the comparing means; and means for outputting a signal representing an end position of the information recorded area when the counting means counts one byte.

12. An information media processing method for outputting an information recorded area detecting signal from a recording medium which has an information recorded area in which information is recorded and an information non-recorded area in which no information is recorded, comprising the steps of:

radiating a light beam onto the information recording medium;

relatively moving the light beam and the information recording medium;

generating an electrical signal only corresponding to the information recorded in the information recorded area, the electrical signal having a first potential level and a second potential level differing from the first potential level;

generating a threshold signal by dropping the first potential level with a prescribed potential and raising the second potential level with the prescribed potential, and delaying the electrical signal;

comparing the electrical signal with the threshold signal and outputting a resulting signal; and detecting that the recording area to which the radiating means is moved by the moving means, is the recording area on which the information will be recorded based on the resulting signal to prevent overwriting information.

* * * * *